(12) United States Patent
Strobl et al.

(10) Patent No.: US 10,471,466 B2
(45) Date of Patent: Nov. 12, 2019

(54) ACTIVE ANTI-ICE COATING, COATING MATERIAL AND METHOD

(71) Applicant: Airbus Defence and Space GmbH, Taufkirchen (DE)

(72) Inventors: Tobias Strobl, München (DE); Dominik Raps, Neuburg (DE); Khalid Zahouily, Lutterbach (FR); Gerard Riess, Mulhouse (FR)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 15/863,222

(22) Filed: Jan. 5, 2018

(65) Prior Publication Data

US 2018/0126415 A1 May 10, 2018

Related U.S. Application Data

(63) Continuation of application No. PCT/EP2016/065710, filed on Jul. 4, 2016.

(30) Foreign Application Priority Data

Jul. 6, 2015 (EP) ..................................... 15175504

(51) Int. Cl.
| | | |
|---|---|---|
| *C08F 2/46* | (2006.01) | |
| *C08F 2/50* | (2006.01) | |
| *C08G 61/04* | (2006.01) | |
| *B05D 3/06* | (2006.01) | |
| *B05D 5/08* | (2006.01) | |
| *C09D 4/00* | (2006.01) | |
| *C09D 4/06* | (2006.01) | |
| *C09D 5/00* | (2006.01) | |
| *C09D 7/63* | (2018.01) | |
| *C08F 222/10* | (2006.01) | |
| *F03D 80/40* | (2016.01) | |
| *B64D 15/00* | (2006.01) | |

(52) U.S. Cl.
CPC ............... *B05D 3/061* (2013.01); *B05D 5/08* (2013.01); *C09D 4/00* (2013.01); *C09D 4/06* (2013.01); *C09D 5/00* (2013.01); *C09D 7/63* (2018.01); *B64D 15/00* (2013.01); *C08F 2222/1086* (2013.01); *F03D 80/40* (2016.05)

(58) Field of Classification Search
CPC . B05D 3/061; B05D 5/08; C09D 4/06; C09D 4/00; C09D 5/00; C09D 7/63; B64D 15/00; C08F 2222/1086; C08F 220/18; F03D 80/40
USPC .......................................... 522/71, 1; 520/1
See application file for complete search history.

(56) References Cited

U.S. PATENT DOCUMENTS

| | | | |
|---|---|---|---|
| 7,008,589 B1 | 3/2006 | Poulakis | |
| 8,647,709 B2 | 2/2014 | Alger | |
| 2002/0139956 A1 | 10/2002 | Simendinger, III et al. | |
| 2010/0152270 A1 | 6/2010 | Suty-Heinze et al. | |
| 2011/0039066 A1 | 2/2011 | Bauer et al. | |
| 2012/0045954 A1 | 2/2012 | Bleecher et al. | |
| 2012/0244287 A1 | 9/2012 | Carter | |
| 2013/0101800 A1* | 4/2013 | Campazzi | C08F 290/067 428/167 |
| 2014/0127516 A1* | 5/2014 | Wang | C08G 18/06 428/422 |
| 2015/0152270 A1* | 6/2015 | Aizenberg | A61L 29/085 210/500.27 |

FOREIGN PATENT DOCUMENTS

| | | |
|---|---|---|
| DE | 19906008 A1 | 8/2000 |
| DE | 102012202517 A1 | 8/2013 |
| WO | WO 2010/127981 A1 | 11/2010 |
| WO | WO 2012/003004 A2 | 1/2012 |
| WO | WO 2014/095112 A1 | 6/2014 |

OTHER PUBLICATIONS

European Search Report for Application No. 15175504.8 dated Sep. 7, 2015.
Corrected European Search Report for Application No. 15175504.8 dated Sep. 24, 2015.
Inernational Preliminary Report on Patentability and Written Opinion for Application No. PCT/EP2016/065710 dated Jan. 9, 2018.
International Search Report for Application No. PCT/EP2016/065710 dated Aug. 16, 2016.

* cited by examiner

*Primary Examiner* — Jessica Whiteley
(74) *Attorney, Agent, or Firm* — Jenkins, Wilson, Taylor & Hunt, P.A.

(57) ABSTRACT

The disclosure herein provides an active anti-ice coating, which is capable of releasing an anti-ice agent, which includes anti-ice agent reservoirs, which are embedded in a UV curable matrix material, for providing an effective anti-ice coating with an active anti-ice agent release over a long period of time.

13 Claims, 3 Drawing Sheets

US 10,471,466 B2

ACTIVE ANTI-ICE COATING, COATING MATERIAL AND METHOD

CROSS-REFERENCE TO RELATED APPLICATIONS

This application is a continuation of and claims priority to PCT/EP2016/065710 filed Jul. 4, 2016 which claims the benefit of and priority to European Patent Application No. 15 175 504.8 filed Jul. 6, 2015, the entire disclosures of which are herein incorporated by reference.

TECHNICAL FIELD

The disclosure herein relates to an active anti-ice coating which is capable of delivering or releasing an anti-ice agent. Furthermore, the disclosure herein relates to a coating material for forming such an anti-ice coating, and a method for producing such an anti-ice coating material. Moreover, the disclosure herein relates to a method for producing an anti-ice coating by such an anti-ice coating material, and a vehicle, an aircraft, a rotor or a wind power plant, which has a surface area provided with such an anti-ice coating.

BACKGROUND

With regard to the technological background and the prior art, reference is made to WO 2012/003004 A2, US 2002/0139956 A1, U.S. Pat. No. 8,647,709 B2, WO 2010/127981 A1, US 2011/0039066 A1, US 2012/0045954 A1, WO 2014/095112 A1 and US 2014/0127516 A1 and US 2012/0244287 A1. The following description is built on the knowledge base of these documents.

Fluid-dynamic bodies, which are operated under atmospheric conditions, as for example in the case of rotor blades of aircrafts or wind power plants or fluid-dynamically active surfaces of aircrafts or the like, are at risk due to the formation of a layer of ice and the deterioration of the fluid-dynamic properties resulting therefrom. It is therefore known to take protective measures for the protection of such fluid-dynamic bodies against the formation of ice. A possible protective measure consists in providing the respective surface areas with an anti-ice coating, which are at risk of developing ice. Most known anti-ice coatings are passive, i.e. they show a certain inherent hydrophobic and ice-phobic property due to a large contact angle and/or a good water drip off behavior. However, a significant disadvantage of these purely passive anti-ice coatings is the relatively high risk of an icing under very cold conditions. Active anti-ice coatings are understood to be coatings, which are capable of delivering an anti-ice agent. Anti-ice agents are substances, compounds, mixtures or batches which have a freezing point lowering property. Such active coatings may avoid an icing also under cold conditions of minus 10° C. and below.

In the prior art, passive anti-ice properties for coatings may be obtained for instance by super hydrophobic polymers—see, for example, US 2012/0045954 A1—or by surface structuring, for instance on the nanoscopic or microscopic level, as shown in WO 2014/095112 A1.

Active anti-ice coatings may be achieved with coatings, which are especially capable of releasing anti-ice liquids—see, for example, US 2012/0244287 A1, U.S. Pat. No. 8,647,709 B2 or US 2002/0139956 A1—or anti-ice proteins—see, for example, WO 2010/127981 A1 or US 2011/00390066 A1.

A further example of an active anti-ice coating is the coating which is commercially available from the company Microphase under the trade name "IcePhob ESL".

Currently known active anti-ice coatings only show a low erosion resistance and a quick leaching of the active agent, as for example an anti-ice protein or an anti-ice liquid. As a result thereof the lifetime of the coating is very limited and difficult to predict.

SUMMARY

It is an object of the present disclosure to provide an active anti-ice coating without the above-mentioned disadvantages.

The above object is realized with an active anti-ice coating, a coating material and a production method according to the disclosure herein.

Advantageous uses of a coating which is producible in this way are also disclosed herein.

According to a first aspect, the disclosure herein provides an active anti-ice coating which is capable of releasing or delivering an anti-ice agent, characterized by or comprising anti-ice agent reservoirs which are embedded or trapped or captured in a UV curable matrix material.

It is preferred that the anti-ice coating comprises 3 to 20% by weight, more preferably 5 to 20% by weight of an anti-ice liquid as the anti-ice agent.

In a preferred embodiment the anti-ice liquid may comprise 1 to 25% (based on the mass of the anti-ice liquid) of copolymer surfactants, relative to the UV curable matrix.

It is preferred that the UV curable matrix material comprises:
  60-80% by weight of polyurethane diacrylates; and
  20-40% by weight of monomers,
  wherein, based on the total mass of polyurethane diacrylates and monomers,
  0.5-5% by weight of photoinitiators, and
  0-2% by weight of additives
  are provided.

The polyurethane diacrylates (PUAs) may be present as one sort of a polyurethane diacrylate or as a mixture of PUAs.

Furthermore, one sort of a monomer or a mixture of monomers may be provided.

In a preferred embodiment a combination of an anti-ice liquid phase with a liquid UV-curable matrix phase leads to the formation of a non-aqueous emulsion which is stabilized by a copolymer. A UV curing of this system leads to a solid matrix coating with dispersed anti-ice fluid.

It is preferred that the anti-ice agent reservoirs which are embedded, captured or trapped in the matrix material are formed from a or with a further UV curable material. Preferably anti-ice agent reservoirs are provided which have an anti-ice liquid trapped or captured in a UV curable material or in UV curable materials. According to one embodiment an anti-ice liquid is trapped in a UV curable network, which will be referred to as glycogel in the following.

According to a further aspect the disclosure herein provides a coating material for forming an anti-ice coating comprising a non-aqueous photopolymerizable emulsion with a liquid photopolymerizable matrix material as a first phase and a photopolymerizable gel, which contains anti-ice liquid, as a second phase.

It is preferred that the second phase contains block copolymer surfactants. Preferably, the second phase is builtup on the basis of PEG. More preferably, the second phase contains PEG and photoinitiators.

According to a further aspect the disclosure herein relates to a method of producing an anti-ice coating material for forming an anti-ice coating comprising:
 a) providing a liquid photopolymerizable matrix material,
 b) providing an anti-ice agent and
 c) introducing the anti-ice agent into the liquid photopolymerizable matrix material.

It is preferred that step a) comprises providing the matrix material such that it makes up 80 to 97% by weight, more preferably 80-95% by weight of the anti-ice coating material.

Preferably, step a) comprises providing a matrix material containing:
 60-80% by weight of polyurethane diacrylates; and
 20-40% by weight of monomers,
 wherein, based on the total weight of polyurethane diacrylate and monomers,
 0.5-5% by weight of photoinitiators, and
 0-2% by weight of additives are provided or added.

The polyurethane diacrylates (PUAs) may be one sort of polyurethane diacrylate or a mixture of PUAs.

Furthermore, also one sort of monomer or a mixture of monomers may be provided.

It is preferred that step b) comprises providing a UV curable gel forming material.

It is preferred that step b) comprises providing an anti-ice liquid.

It is preferred that step b) comprises synthesizing a UV curable gel which contains, traps or encapsulates anti-ice liquid.

It is preferred that a matrix material containing 80-95% by weight of polyurethane acrylates and monomers, 0.5-5% by weight of photoinitiators and 0-2% by weight of additives is provided.

It is preferred that the amount of anti-ice liquid in the anti-ice agent as for example in a non-aqueous gel is 80-90% by weight. Advantageously, 80-90% by weight of anti-ice liquid, as for example ethylene glycol (EG), and 10-20% by weight of UV curable monomers are used for forming a gel.

It is preferred that a UV curable glycogel (especially on PEG basis) with anti-ice liquid as anti-ice agent is formed which is captured or trapped by surfactants.

A preferred embodiment of the method contains: forming a photopolymerizable non-aqueous emulsion with a photopolymerizable liquid matrix material as a first phase and a photopolymerizable gel material as a second phase, in which an anti-ice liquid is embedded or trapped.

Preferably, 10-20% by weight of the gel and 80-90% by weight of the matrix material are used for forming the emulsion.

According to a further aspect the disclosure herein relates to a method for producing an anti-ice coating comprising: carrying out the method for producing the coating material according to one of the preceding embodiments for providing coating material or for providing a coating material, as specified further above according to one of the preferred embodiments, and applying the coating material on a surface to be coated and UV curing the coating material.

According to a further aspect the disclosure herein relates to a vehicle, an aircraft or a rotor or wind energy plant comprising a surface area which is coated with such an anti-ice coating.

A particular aspect of the disclosure herein relates to UV curable two-phase anti-ice coatings and method for producing the same.

A preferred embodiment is based on a photopolymerizable, non-aqueous emulsion, wherein the matrix phase is built up from a photopolymerizable system—as for example radical, cationic and/or hybrid systems—and the dispersed part is built up from UV curable reservoir systems which contain anti-ice liquids. The coatings which are developed from such non-aqueous emulsions lead to good anti-ice properties and good impact resistant properties. The active agent is trapped, captured or encapsulated, such that a too quick release or delivery is limited and such that the agents do not reduce the mechanical properties of the coatings.

One advantage of the coating according to the disclosure herein is the combination of smart active anti-ice capabilities with a high erosion resistance.

The UV-curable reservoir coatings, which have been developed from such two-phase systems, have further advantages of a progressive release of anti-ice liquids, which guarantees the anti-ice properties over a long period of time. Apart from this advantage of a sustained and controlled release there is the further advantage that the choice of anti-ice agent is much broader than in the case of conventional coatings due to the fact that the coating matrix itself is only partially in contact with the ice suppressing additive. It may be noted as a positive side effect that the erosion resistance of the coatings according to the disclosure herein is much higher than in the case of the currently commercially available coatings. The improved anti-ice properties and deicing properties and the increase of the erosion resistance have been confirmed in laboratory tests and in ice wind tunnel tests on a smaller scale and in erosion tests.

Multiphase photocurable coatings with anti-ice, anti-erosion and impact resistance properties have been developed, which are based on an environmentally friendly non-aqueous emulsion. The coatings have been designed and formulations have been produced and applied to aluminum panels. Wind tunnel tests on a laboratory scale have been carried out. In doing so, first coating formulations for anti-ice tests showed promising anti-ice properties. The coating material may be used like other UV curable coatings.

BRIEF DESCRIPTION OF THE DRAWINGS

Hereinafter embodiments of the disclosure herein will be illustrated by the corresponding, example drawings.

FIG. 2 is a schematic representation of a first step of a further method for producing a UV curable anti-ice coating, wherein FIG. 2 shows a procedure for synthesizing a glycogel, in which an anti freezing liquid is trapped in a UV curable matrix;

DETAILED DESCRIPTION

Figure 1:
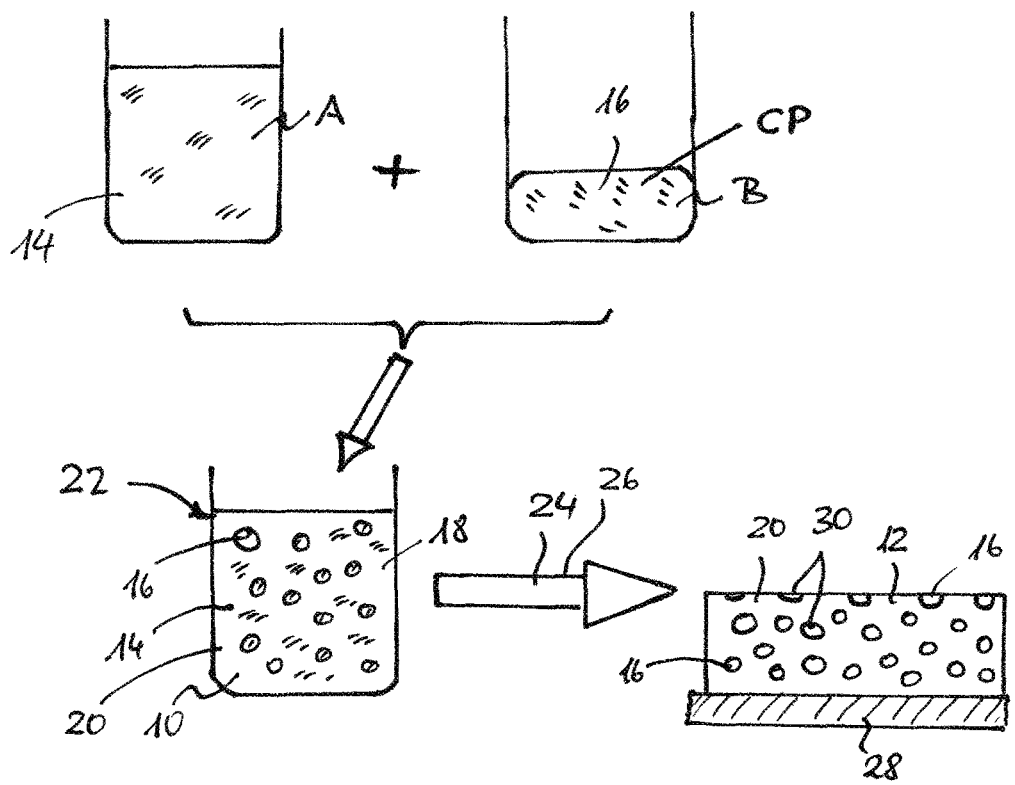
FIG. 1 is a schematic representation of a method for producing a UV curable anti-ice coating.

In the following the production of a first generation of biphasic UV curable anti-ice coating 14 is described by the representation in FIG. 1. The production starts with 80 to 97% by weight of a first component A and 3 to 20% by weight of a second component B, which are combined by copolymer CP to a coating material 10 for forming an active anti-ice coating 12.

As a first component in particular a liquid UV curable coating material 14 is used. An anti-ice liquid 16 having a freezing point lowering property is used for forming the second component B.

Examples for possible anti-ice liquids 16 are described in US 2014/0127516 A1, [0058].

Component B additionally contains 5 to 20% by weight of the copolymers CP (based on the mass of B).

According to a preferred embodiment a photo-induced curing liquid of 60 to 80% by weight of PUA (polyurethane diacrylate) and 20 to 40% by weight of monomers is used as the first component A. 0.5 to 5% by weight (based on the total mass of PUA and monomers) of photoinitiators and optionally 0 to 2% by weight (based on the total mass of PUA and monomers) of additives are added to the first component.

As a result an emulsion 18 of a first component A as a matrix material 20 and an anti-ice liquid 16 as component B which is dispersed therein is obtained. The emulsion 18 of matrix material 20 and anti-ice liquid 16 dispersed therein represents a liquid UV curable formulation 22. Applying 24 the formulation 22 and using UV light for UV curing 26 results in the active anti-ice coating 12 on a substrate 28. Surface areas of vehicles and aircrafts, of rotors and wind energy plants or the same may serve as a substrate 28.

The active anti-ice coating 12 has anti-ice agent reservoirs 30 which are embedded in the UV curable matrix material 20. The anti-ice liquid 16 is located in the anti-ice agent reservoirs. The anti-ice agent reservoirs 30 release the anti-ice liquid 16 on the surface of the anti-ice coating 12. Upon erosion of the active anti-ice coating 12 again and again new anti-ice reservoirs 30 are exposed.

The presence of the anti-ice liquid 16 on the surface of the anti-ice coating 12 leads to the prevention or the delay of the formation of ice.

In the following a method for producing a second generation of a biphasic UV curable coating based on UV glycogel 40 is illustrated in more detail by the representation in FIGS. 2 to 4. The method comprises two steps. A first step is indicated in FIG. 2, while a second step is shown in FIG. 3.

The first step relates to the synthesis of a UV glycogel 40. The second step relates to the dispersion of the UV glycogel 40 in the UV curable formulation of the first component A.

Figure 2:
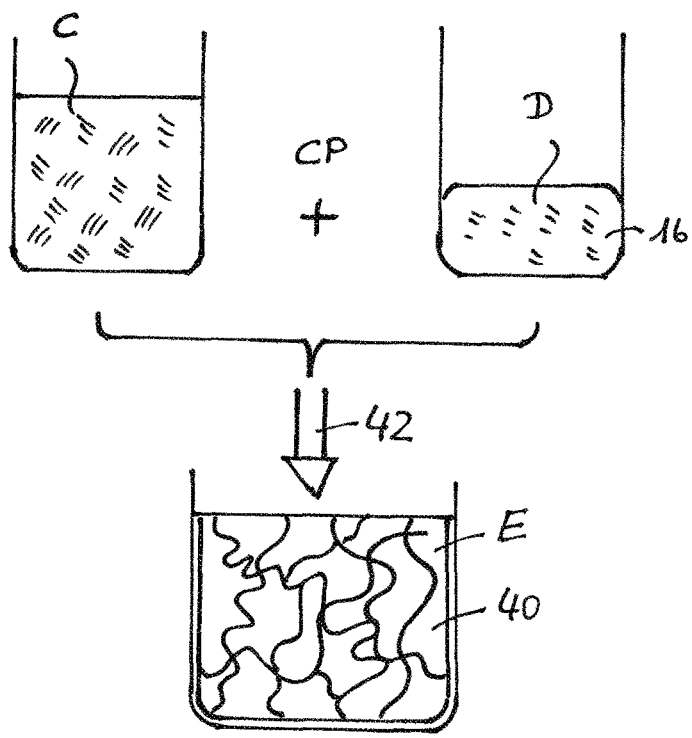
Figure 3:
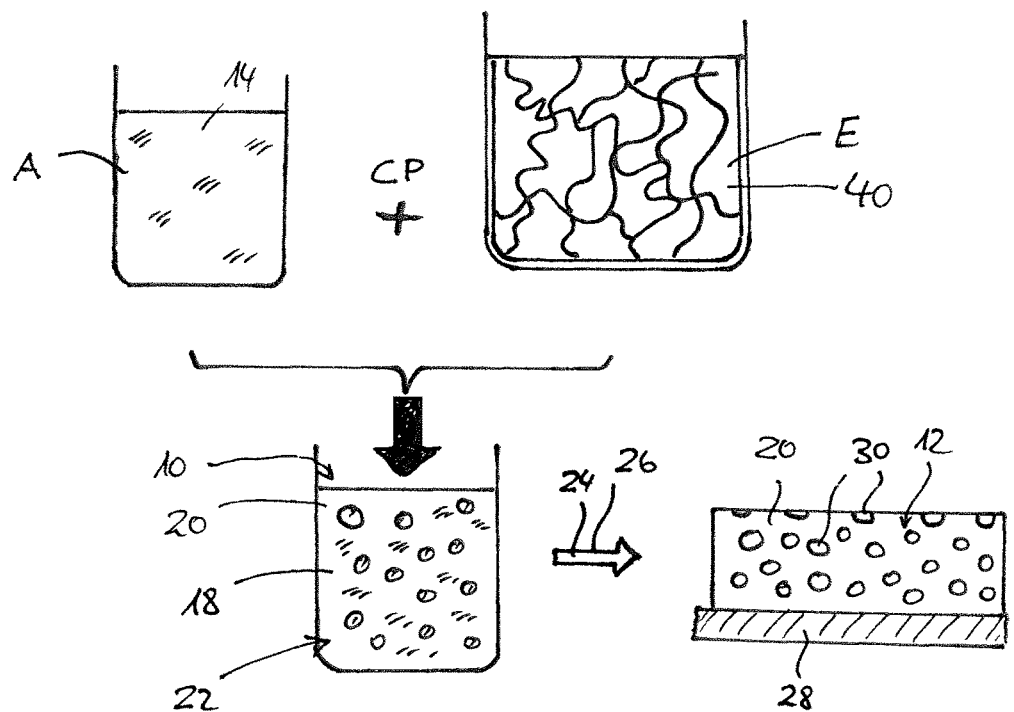
FIG. 3 is a second step of the further production method.

As is apparent from FIG. 2, the first step of forming the UV glycogel 40 starts with a third component C and a fourth component D, which are combined by copolymer CP and UV application to the UV glycogel 40.

UV curable monomers, for example based on polyethylene glycol (PEG), serve as third compound C.

The desired anti-ice liquid 16 is used as component D. In one example ethylene glycol (EG) is used. Further examples of possible anti-ice liquids 16 are described in US 2014/0127516 A1, [0058].

The weight of the glycogel comprises exemplary amounts of the third component D (ice liquid 16) in the range from 80 to 95%, preferably 80 to 90%, and of the fourth component C (UV curable monomers) in the range from 5 to 20%, preferably 10 to 20%.

The application of UV light 42 to the mixture of the third component C and the fourth component D leads to the formation of the UV glycogel 40 with anti-ice liquid 16 captured or trapped therein. This UV glycogel 40 forms a fifth component E which is applied in the second step, which will be hereinafter illustrated in more detail by FIG. 3. The fifth component E is an example for an anti-ice agent.

In this second step an emulsion 18 is formed from the first component A—as specified further above—and the fifth component E (UV glycogel 40). As an example, 10 to 20% by weight are admixed in 80 to 90% by weight of the component A, based on the total mass of the emulsion 18.

In the emulsion 18 according to FIG. 3 the UV glycogel 40 and the anti-ice liquid 16 captured therein are dispersed in the still liquid UV curable matrix material 20.

The emulsion 18 represents the coating material 10, and the active anti-ice coating 12 is obtainable by applying 24 the emulsion 18 and UV curing 26. The first component A makes up 80 to 90% by weight of the emulsion 18. A liquid UV curable coating serves as a first component A, for example with a composition of 60 to 80% by weight of PUA, 20 to 40% by weight of monomers. 0.5 to 5% by weight of photoinitiators and 0 to 2% by weight of additives are added to this first component A based on the total amount of PUA and monomers.

In different embodiments the fifth component E may be dispersed in the emulsion 18 in a weight amount of 10 to 20%. The fifth component E is formed in particular by the UV glycogel 40 with anti-ice liquid 16 trapped therein.

In an example the fifth component E is made of acrylate monomers from the component C, to which photoinitiators and eventually additives may be added, and anti-ice liquid from the component D.

The coating material 10, which is present as emulsion 18, then forms a liquid UV curable formulation 22, which turns into the active anti-ice coating 12 on the substrate 28 upon its application 24 and UV curing 26.

In the UV glycogel 40 the anti-ice liquid 16 is also captured or trapped in a UV curable matrix.

Thus, the finished product of an anti-ice coating 12 comprises the anti-ice agent reservoirs 30 with anti-ice liquid 16 trapped or captured in matrix material 20, 40, in order to release anti-ice liquid 16 on the surface.

Figure 4:
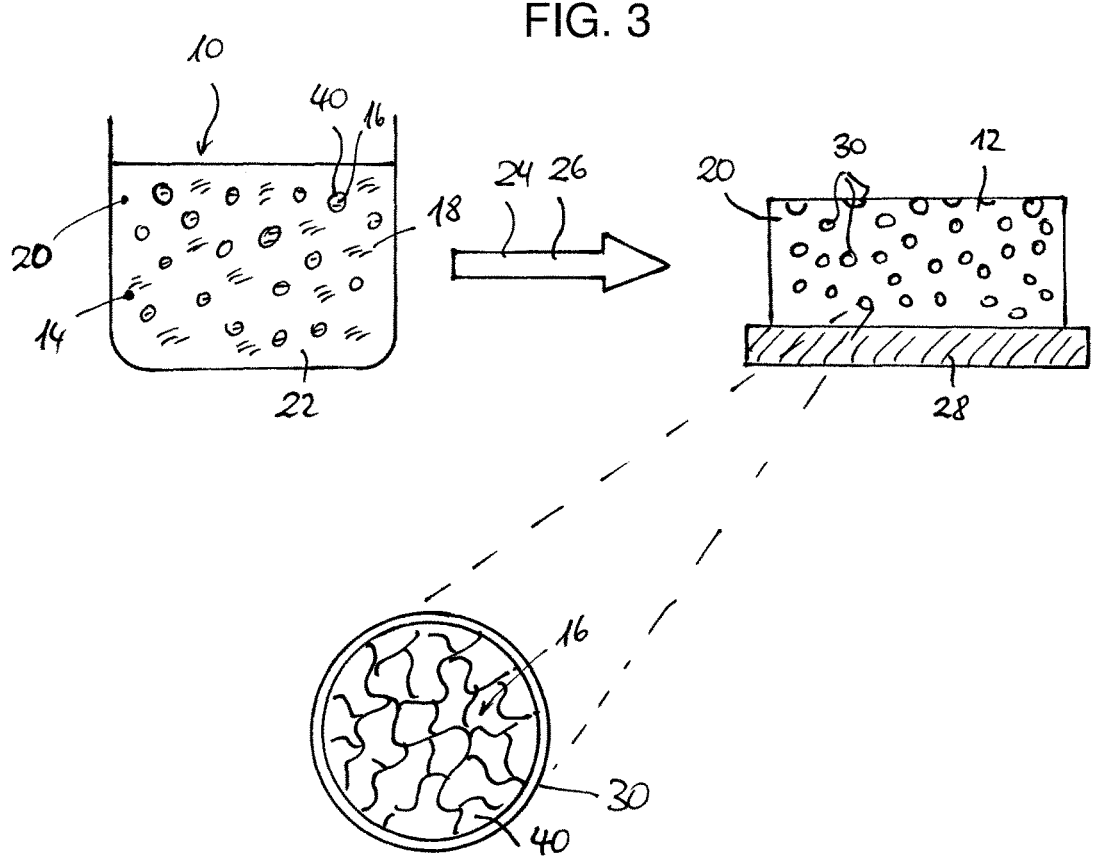
FIG. 4 is a schematic representation of a production of an active anti-ice coating from the coating material which has been produced according to FIG. 3 with an enlarged representation of an anti-ice agent reservoir.
Figure 5:
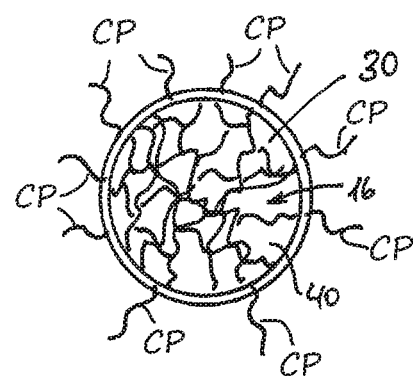
FIG. 5 is an enlarged representation of the anti-ice agent reservoir.
Figure 6:
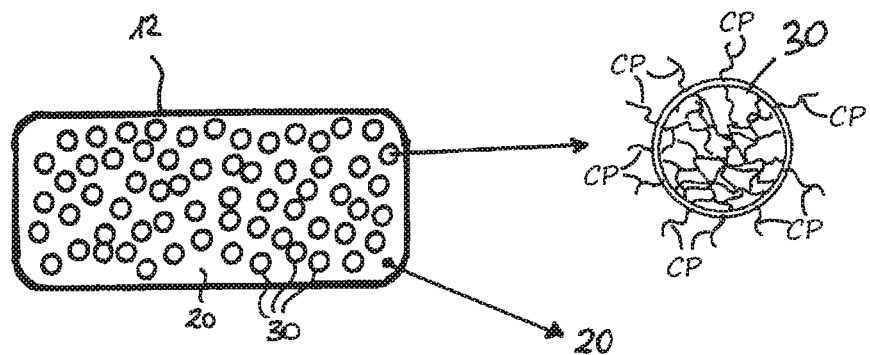
FIG. 6 is a schematic representation of an active anti-ice coating, which has been produced according to the method of FIG. 2 to FIG. 5, with an enlarged representation of an anti-ice agent reservoir.
Figure 7:
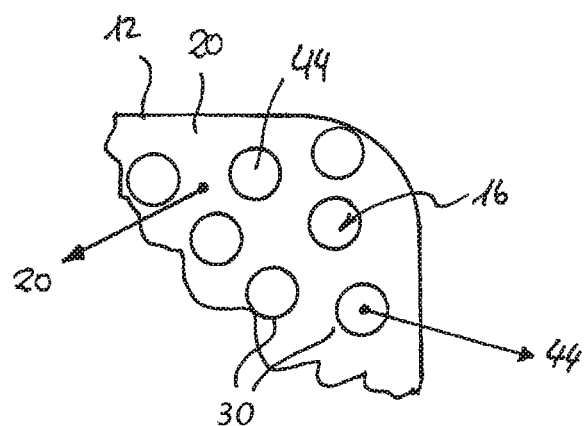
FIG. 7 is an enlarged representation of a smaller part of the active anti-ice coating.

FIGS. 4 and 5 show an enlarged representation of the anti-ice agent reservoirs 30. Inside there are the anti-ice liquid 16 and monomers, which on the outside are linked to the matrix material 20 by copolymer CP.

Thus, in the finished anti-ice coating 12 the UV cured matrix material of the first component A with an anti freezing phase 44 embedded therein is provided. In one embodiment this anti freezing phase 44, which forms the anti-ice agent reservoirs 30, comprises 1 to 20% by weight of anti-ice liquid, 16.0 to 20% of monomers and 0 to 5% of photoinitiators and copolymer surfactants.

An active anti-ice coating 12 with excellent erosion resistance and encapsulated anti-ice agent reservoirs 30 is thus obtained, which enables a sustained continuing release of anti-ice liquid 16 during the use of the anti-ice coating 12.

In the following specific examples of UV curable coating materials for forming an anti-ice coating are given, which are obtained with one of the above illustrated production methods.

EXAMPLE 1

A UV curable first matrix I with the following composition is produced as component A:

| | |
|---|---|
| PUA-UVU 9321HD12 from the company Polymer Technology | 58% |
| Photomer 4172F from the company Cognis | 20% |
| Bisomer PEA6 from the company Cognis | 10% |
| SR 268US from the company Sartomer | 10% |
| TPO (Pi) photoinitiator from the company BASF | 2% |

From this a coating material with the following composition is produced according to the above-mentioned method of the first generation:

| | |
|---|---|
| UV curable first matrix I | 89.3% |
| copolymer surfactants | 1.8% |
| ethylene glycol | 8.9% |

EXAMPLE 2

A UV curable second matrix II with the following composition is produced as component A:

| | |
|---|---|
| UVP 6021-HD15 4 from the company Ssunin | 77.2% |
| SR 355 from the company Arkema | 8.7% |
| Si. acrylate A from the company Bluestar | 2.3% |
| Butyle acrylate monomers from the company Aldrich | 10% |
| Chivacure 173 from the company Chitec | 1.8% |

From this a coating material with the following composition is produced according to the above-mentioned method of the first generation:

| | |
|---|---|
| UV curable second matrix 11 | 89.3% |
| copolymer surfactants | 1.8% |
| ethylene glycol | 8.9% |

EXAMPLE 3

A UV curable third matrix III with the following composition is produced as component A:

| | |
|---|---|
| UVP 6021-HD15 from the company Ssunin | 88% |
| SR 355 from the company Arkema | 10% |
| Chivacure 173 from the company Chitec | 2% |

From this a coating material with the following composition is produced according to the above-mentioned method of the first generation:

| | |
|---|---|
| UV curable third matrix III | 87.5% |
| copolymer surfactants | 2.5% |
| ethylene glycol | 10% |

In the examples ethylene glycol is used as the anti-ice liquid which is embedded in the UV curable matrix.

In tests the coating material of example 1 has shown the lowest ice adhesion value; the examples 2 and 3 also showed promising results.

The method of the second generation as described further above differs from the above-mentioned examples additionally in that the anti-ice liquid is first captured in a UV polymerizable gel and that this mixture (instead of the anti-ice liquid in examples 1 to 3) and the matrix are the processed to an emulsion.

In the following specific examples for the second generation are illustrated in more detail.

EXAMPLE 4

A glycogel (designated as glycogel 131) with the following composition is synthesized as component E:

| | |
|---|---|
| SR610 from the company Arkema | 1.96% |
| Bisomer PEA from the company GEO Speciality Chemicals | 7.84% |
| Irgacure 2959 from the company BASF | 0.2% |
| ethylene glycol | 90% |

The substances are mixed and submitted to a UV irradiation with a UV dose of 5.000 mJ for the fusion or the gel formation for producing the glycogel.

A UV curable fourth matrix IV with the following composition is produced as component A:

| | |
|---|---|
| PUA-UVU 9321HD12 from the company Polymer Technology | 58% |
| Photomer 4172F from the company Cognis | 20% |
| Bisomer PEA6 from the company Cognis | 10% |
| SR 268US from the company Sartomer | 10% |
| Chivacure 173 from the company Chitec | 2% |

Then an emulsion with the following composition is produced from the matrix IV and glycogel 131 (components A and E):

| | |
|---|---|
| UV curable matrix IV | 88.2% |
| copolymer surfactant | 2% |
| Glycogel 131 | 8.9% |

EXAMPLE 5

A glycogel (designated as Glycogel 121) with the following composition is synthesized as component E:

| | |
|---|---|
| SR344 from the company Arkema | 2% |
| Bisomer PEA from the company GEO Speciality Chemicals | 7.8% |
| Irgacure 2959 from the company BASF | 0.2% |
| EG (ethylene glycol) | 90% |

The substances are mixed and submitted to a UV irradiation with a UV dose of 1.000 mJ for the fusion or the gel formation for producing the glycogel.

A UV curable fifth matrix V with the following composition is produced as component A:

| | |
|---|---|
| UVP 6021-HD15 4 from the company Ssunin | 88% |
| SR 355 from the company Arkema | 10% |
| Chivacure 173 from the company Chitec | 2% |

Then an emulsion with the following composition is produced from matrix V and Glycogel 131 (components A and E):

| | |
|---|---|
| UV curable matrix V | 88.2% |
| copolymer surfactant | 2% |
| Glycogel 121 | 8.9% |

The UV curing fusion in examples 4 and 5 was carried out with an "Arc bulb LC6B Benchtop Conveyor".

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LISTING OF REFERENCE NUMERALS

A first component
B second component
C third component
D fourth component
E fifth component
CP copolymer
10 coating material
12 active anti-ice coating
14 liquid UV hardable coating
16 anti-ice liquid
18 emulsion
20 matrix material
22 liquid UV curable coating
24 Applying
26 UV curing
28 substrate
30 anti-ice agent reservoir
40 UV glycogel
42 UV application
44 anti freezing phase

The invention claimed is:

1. An active anti-ice coating for releasing an anti-ice agent, wherein the anti-ice coating comprises a plurality of anti-ice agent reservoirs which are embedded in a UV curable matrix material, wherein each of the plurality of anti-ice agent reservoirs comprises an additional UV curable material in which the anti-ice liquid is captured or embedded.

2. The anti-ice coating according to claim 1, wherein the anti-ice coating comprises 3 to 20% by weight or 5 to 20% by weight of an anti-ice liquid as the anti-ice agent.

3. The anti-ice coating according to claim 1, wherein the UV curable matrix material comprises:
60-80% by weight of polyurethane diacrylates; and
20-40% by weight of monomers,
wherein, based on a total mass of polyurethane diacrylates and monomers, furthermore 0.5-5% by weight of photoinitiators, and
0-2% by weight of additives
are provided.

4. A coating material for forming an anti-ice coating according to claim 1, comprising a non-aqueous photopolymerizable emulsion with a liquid photopolymerizable matrix material as a first phase and a photopolymerizable gel, which contains anti-ice liquid, as a second phase.

5. The coating material according to claim 4, wherein the second phase contains block copolymer surfactants and/or is based on photopolymerizable PEG.

6. A method for producing an anti-ice coating material for forming an anti-ice coating, the method comprising:
a) providing a liquid photopolymerizable matrix material;
b) providing an anti-ice agent, wherein providing an anti-ice agent comprises synthesizing a UV curable gel which contains anti-ice liquid; and
c) introducing the anti-ice agent into the liquid photopolymerizable matrix material.

7. The method according to claim 6, wherein step a) contains at least one or more or all of steps as follows:
a1) providing the matrix material such that the matrix material constitutes 80-97% by weight of the anti-ice coating material; and/or
a2) providing a matrix material containing:
60-80% by weight of polyurethane diacrylate; and
20-40% by weight of monomers;
wherein furthermore, based on a total weight of polyurethane diacrylate and monomers,
0.5-5% by weight of photoinitiators, and
0-2% by weight of additives
are provided.

8. The method according to claim 6, wherein step b) further contains at least one or all of the following steps:
b1) providing a UV curable gel forming material; and
b2) providing an anti-ice liquid.

9. The method according to claim 8, comprising:
in step b1) a matrix material containing 80-95% by weight of acrylate monomer, 0.5-5% by weight of photoinitiators and 0-2% by weight of additives is provided, and/or
an amount of anti-ice liquid in the anti-ice agent amounts to 80-90% by weight, and/or
in step b) a UV curable glycogel with an anti-ice liquid as anti-ice agent which is captured or trapped by surfactants is formed.

10. The method according to claim 6, comprising:
forming a photopolymerizable non-aqueous emulsion with the liquid photopolymerizable matrix material as a first phase and the UV curable gel as second phase, in which an anti-ice liquid is embedded.

11. The method for producing an anti-ice coating according to claim 6, comprising:
carrying out the method to provide a coating material for forming an anti-ice coating, the coating material comprising a non-aqueous photopolymerizable emulsion with the liquid photopolymerizable matrix material as a first phase and the UV curable gel, which contains anti-ice liquid, as a second phase, the coating material comprising an active anti-ice coating for releasing an anti-ice agent, comprising anti-ice agent reservoirs which are embedded in a UV curable matrix material; and
applying the coating material on a surface to be coated and UV curing the coating material.

12. The method according to claim 11 used to produce a vehicle, aircraft or rotor or wind energy plant comprising a surface area which is at least partly provided with an active anti-ice coating for releasing an anti-ice agent, comprising anti-ice agent reservoirs which are embedded in a UV curable matrix material.

13. A vehicle, aircraft or rotor or wind energy plant comprising a surface area which is at least partly provided with an anti-ice coating according to claim 1.

* * * * *